(12) United States Patent
Janssen et al.

(10) Patent No.: US 11,143,739 B2
(45) Date of Patent: Oct. 12, 2021

(54) POSITIONING SYSTEM FOR DETERMINING A LOCATION OF AN OBJECT

(71) Applicant: SIGNIFY HOLDING B.V., Eindhoven (NL)

(72) Inventors: Niek Janssen, Eindhoven (NL); Robertus Johannes Polman, Nijmegen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 83 days.

(21) Appl. No.: 16/605,103

(22) PCT Filed: Apr. 5, 2018

(86) PCT No.: PCT/EP2018/058757
§ 371 (c)(1),
(2) Date: Oct. 14, 2019

(87) PCT Pub. No.: WO2018/189031
PCT Pub. Date: Oct. 18, 2018

(65) Prior Publication Data
US 2021/0141050 A1  May 13, 2021

(30) Foreign Application Priority Data

Apr. 14, 2017 (EP) ...................... 17166687

(51) Int. Cl.
*H04R 29/00* (2006.01)
*G01S 5/22* (2006.01)
(Continued)

(52) U.S. Cl.
CPC ............... *G01S 5/22* (2013.01); *G10L 15/22* (2013.01); *G10L 25/51* (2013.01); *H04R 1/08* (2013.01); *G10L 2015/223* (2013.01)

(58) Field of Classification Search
CPC ..................................................... H04R 29/00
See application file for complete search history.

(56) References Cited

U.S. PATENT DOCUMENTS 6,331,817 B1 * 12/2001 Goldberg ........... G08B 13/1427
340/10.1
10,158,728 B1 * 12/2018 VanBlon ................. H04L 67/18
(Continued)

FOREIGN PATENT DOCUMENTS

DE  202009005690 U1  9/2010
WO  2010011471 A1  1/2010
WO  2011029672 A2  3/2011

*Primary Examiner* — Olisa Anwah

(57) ABSTRACT

A positioning system (100) for determining a location of an object is disclosed. The positioning device comprises a plurality of microphones (M1-M6) configured to receive a sound input (122) from a user (120), a localization module (102) configured to determine a user location of the user relative to the plurality of microphones based on differences between the sound input received at different microphones of the plurality of microphones, and a processor (104) configured to receive an identifier of the object, identify the object based on the identifier, determine the location of the object by setting the location of the object equal to the user location, and store the location of the object in a memory.

16 Claims, 4 Drawing Sheets

(51) Int. Cl.
*G10L 15/22* (2006.01)
*G10L 25/51* (2013.01)
*H04R 1/08* (2006.01)

(56) References Cited

U.S. PATENT DOCUMENTS

| | | | |
|---|---|---|---|
| 10,655,951 B1* | 5/2020 | Froment | G06K 9/00671 |
| 2008/0040036 A1* | 2/2008 | Peters | G01C 3/04 |
| | | | 701/491 |
| 2013/0088168 A1* | 4/2013 | Mohan | H05B 47/175 |
| | | | 315/297 |
| 2015/0181328 A1* | 6/2015 | Gupta | H04R 3/005 |
| | | | 381/56 |
| 2016/0034600 A1* | 2/2016 | Joshi | G06F 16/90335 |
| | | | 707/769 |
| 2016/0313963 A1* | 10/2016 | Kang | G06F 3/0416 |
| 2018/0189661 A1* | 7/2018 | Tatourian | H04W 4/029 |
| 2018/0306895 A1* | 10/2018 | Nossik | G01S 5/0284 |
| 2019/0394857 A1* | 12/2019 | Chraibi | G06F 3/167 |
| 2020/0408906 A1* | 12/2020 | Schediwy | G01S 15/588 |

* cited by examiner

400

POSITIONING SYSTEM FOR DETERMINING A LOCATION OF AN OBJECT

CROSS-REFERENCE TO PRIOR APPLICATIONS

This application is the U.S. National Phase application under 35 U.S.C. § 371 of International Application No. PCT/EP2018/058757, filed on Apr. 5, 2018, which claims the benefit of European Patent Application No. 17166687.8, filed on Apr. 14, 2017. These applications are hereby incorporated by reference herein.

FIELD OF THE INVENTION

The invention relates to a positioning system for determining a location of an object. The invention further relates to a method for determining a location of an object and to a computer program for executing the method.

BACKGROUND

Network-connected devices, such as TVs, lamps, thermostats, (kitchen) appliances, etc. become more prominent in home environments. These devices can be controlled by control devices such as smartphones, remote control devices but also by other connected-devices. Such connected systems, also referred to as 'the internet of things', often require information about the relative locations of the connected devices in the space. If locations of connected devices are known, they can be controlled according to their location. This may, for example, be relevant when multiple lighting devices are controlled to generate a spatial light effect, when multiple loudspeakers are controlled for surround sound, etc.

Current (indoor) positioning systems use, for example, a plurality of radio frequency (RF) beacons distributed throughout the space that may transmit RF signals to connected devices, which enable detection of the device's position relative to the beacons by using triangulation or trilateration based on for example the time-of-flight (TOF) of the RF signals received from the beacons, or based on the received signal strength of the RF signals received from the beacons. In other (indoor) positioning systems, connected devices may comprise light sensors for detecting coded light signals emitted by a light source of a luminaire. These coded light signals may comprise location information about the luminaire, thereby enabling detection of the device's position.

These existing (indoor) positioning system require that the connected device comprises some sort of dedicated communication means and software for determining the position of the connected device. Many existing connected devices are not equipped with such dedicated positioning communication means/software. Thus, there is a need in the art to determine positions of devices and objects that do not comprise positioning means.

SUMMARY OF THE INVENTION

It is an object of the present invention to provide a way to determine positions of devices and objects that do not comprise dedicated positioning means.

According to a first aspect of the present invention, the object is achieved by a positioning system for determining a location of an object, the positioning device comprising:

a plurality of microphones configured to receive a sound input from a user, a localization module configured to determine a user location of the user relative to the plurality of microphones based on differences between the sound input received at different microphones of the plurality of microphones, and a processor configured to receive an identifier of the object, identify the object based on the identifier, determine the location of the object by setting the location of the object equal to the user location, and store the location of the object in a memory.

The positioning system enables a user to provide input to set the location of the object. The user may move towards the object and provide the sound input, for example a voice input, whereupon the localization module determines the location of the user, and whereupon the processor stores the location of the object (which has been set equal to the location of the user). The location of the object is then stored in the memory, which enables the positioning system to provide the location of the object to further devices (e.g. connected devices in a connected home system). This enables determining and storing positions of objects (e.g. devices, furniture, etc.) that do not comprise positioning means.

The sound input may comprise the identifier of the object, and the processor may be configured to retrieve the identifier from the sound input. The sound input may, for example, be a voice input comprising information about the object (for example, the voice input may comprise "this is the location of the [name of object]", wherein the [name of object] may be the identifier). Additionally or alternatively, the positioning system may comprise a receiver configured to receive the identifier from the object. The object may be a device configured to transmit its identifier to the positioning system. This may be beneficial, because it does not require the user to provide the identifier. This may further be beneficial if the positions of multiple objects/devices of the same type (e.g. a plurality of lamps) need to be determined subsequently, because it may be cumbersome for a user to provide the correct identifier for each lamp. Additionally or alternatively, the receiver may be configured to receive the identifier from a further device, for example a smartphone, which may be operated by the user. The user may instruct the further device to start transmitting the identifier of a specific object, and the user may provide a sound input, which enables the processor to determine that that sound input (and therewith the location of that sound input) corresponds to that specific object.

The object may be located in a space, and the localization module may be further configured to access information about positions of the plurality of microphones relative to the space, and configured to determine the user location relative to the space based on differences between the sound input received at different microphones of the plurality of microphones. If the plurality of microphones have a position relative to the space, the processor is enabled to determine the position of the user (and therewith the position of the object) relative to the space wherein it is located.

The positioning system may be comprised in a portable device (e.g. a smart speaker comprising the plurality of microphones), and the positioning system may comprise an orientation and/or a location sensor. The localization module may be configured to determine the user location relative to the space further based on an orientation signal received from the orientation sensor and/or a location signal received from the location sensor. Thus, when a user moves and/or rotates the positioning system, the processor takes these movements/rotations into account, such that the localization module is able to determine the location of objects relative to the space correctly. This is beneficial, because it enables the user to reposition the portable device.

The processor may be configured to generate a map of the space, and determine a position of the object on the map based on the location of the object. This is beneficial, because other devices may use this map for control purposes. Additionally, the map may be communicated to a user, for example via a user interface, which may enable the user to edit/correct the mapping of the object(s) in the space and thus fine-tune the mapping.

In embodiments, the localization module may be configured to determine the user location based on differences in signal strength of the sound input received at different microphones of the plurality of microphones. The localization module may compare the differences in signal strength (e.g. by comparing spectrograms and/or dB levels of different microphones) to determine, for example by triangulation or trilateration, the user location of the user.

Additionally or alternatively, the localization module may be configured to determine the location of the user based on differences in time between receiving the sound input at different microphones of the plurality of microphones. By detecting differences in time of arrival of the sound input at different microphones, the localization module is able to determine the user location of the user by applying triangulation or trilateration.

Additionally, in embodiments wherein at least some of the plurality of microphones are directed in different directions, the localization module may be configured to determine the user location of the user relative to microphones further based on the directions of the plurality of microphones. When the microphones are directed in different directions, their directionality may be of influence on how strong a received sound input is (or be of influence of the time of arrival of the sound input). Therefore, it is beneficial if the localization module takes the directions of the microphones into account when determining the user location of the user relative to the controller.

The sound input further may comprise a control command, and the processor may be further configured to retrieve the control command from the sound input, and to control the object based on the control command. This beneficial, because it enables the user to, for example, set the object (e.g. a device) to a certain mode of operation, configure the settings of the object, etc. by providing a voice command.

The plurality of microphones may be configured to receive a subsequent sound input, which subsequent sound input comprises a control command, and the localization module may be configured to determine which one or more objects are located at the user location by accessing the memory storing locations of the one or more objects, and to control the one or more objects based on the control command. This beneficial, because it enables the user to, for example, set the object (e.g. a device) to a certain mode of operation, configure the settings of the object, etc. by providing a voice command after the location of the object has been determined.

The processor may be configured to identify the user based on the sound input, and to control the one or more objects further based on a user profile associated with the identified user. The processor may use voice recognition to identify the user, and/or the user may provide a voice command providing a user identifier (e.g. "this is [name of user]"). The processor may be configured to access a database storing the user profile. The user profile may comprise user preferences (e.g. favorite light settings, favorite object settings), and the processor may determine how to control the object (e.g. a lighting device) based on these preferences. This is beneficial, because the light output of the object is controlled based on the preference of the user who provides the sound input.

The object may be a lighting device. Typically, lighting systems comprise multiple lighting devices. Such lighting systems are often able to control the lighting devices according to a light scene (a predefined light setting comprising lighting control commands for a plurality of lighting devices, or a light setting for a plurality of lighting devices that changes over time). For many of such light scenes (e.g. a sunrise light scene, a romantic light scene, a concentrate light scene, etc.) it is preferred that the locations of lighting devices are known in order apply the light scene correctly. If, for example, the light scene is supposed to resemble the trajectory of the sun, it is beneficial if the locations of the lighting devices are known such that the trajectory can be resembled accurately. In another example, a user may be working at his desk and may request a concentration light setting (e.g. by providing a voice command, a user input, etc.), whereupon the lighting device near/at the desk may provide the requested light setting, whereas light settings of other lighting devices in the room may be unchanged.

The sound input may be a voice input. Alternatively, the sound input may be any other sound input provided by the user (e.g. a clapping sound, a whistling sound, a ticking sound, a sound provided by a (portable) device upon receiving a user input at that device, etc.).

According to a second aspect of the present invention, the object is achieved by a method for determining a location of an object, the method comprising:

receiving, by a plurality of microphones, a sound input from a user, determining a user location of the user relative to the plurality of microphones based on differences between the sound input received at different microphones of the plurality of microphones, receiving an identifier of the object, identifying the object based on the identifier, determining the location of the object by setting the location of the object equal to the user location, and storing the location of the object in a memory.

It should be understood that the method may have similar and/or identical embodiments and advantages as the claimed positioning system.

According to a third aspect of the present invention, the object is achieved by a computer program product for a computing device, the computer program product comprising computer program code to perform any one of the above-mentioned methods when the computer program product is run on a processing unit of the computing device.

BRIEF DESCRIPTION OF THE DRAWINGS

The above, as well as additional objects, features and advantages of the disclosed positioning systems and methods will be better understood through the following illustrative and non-limiting detailed description of embodiments of systems and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
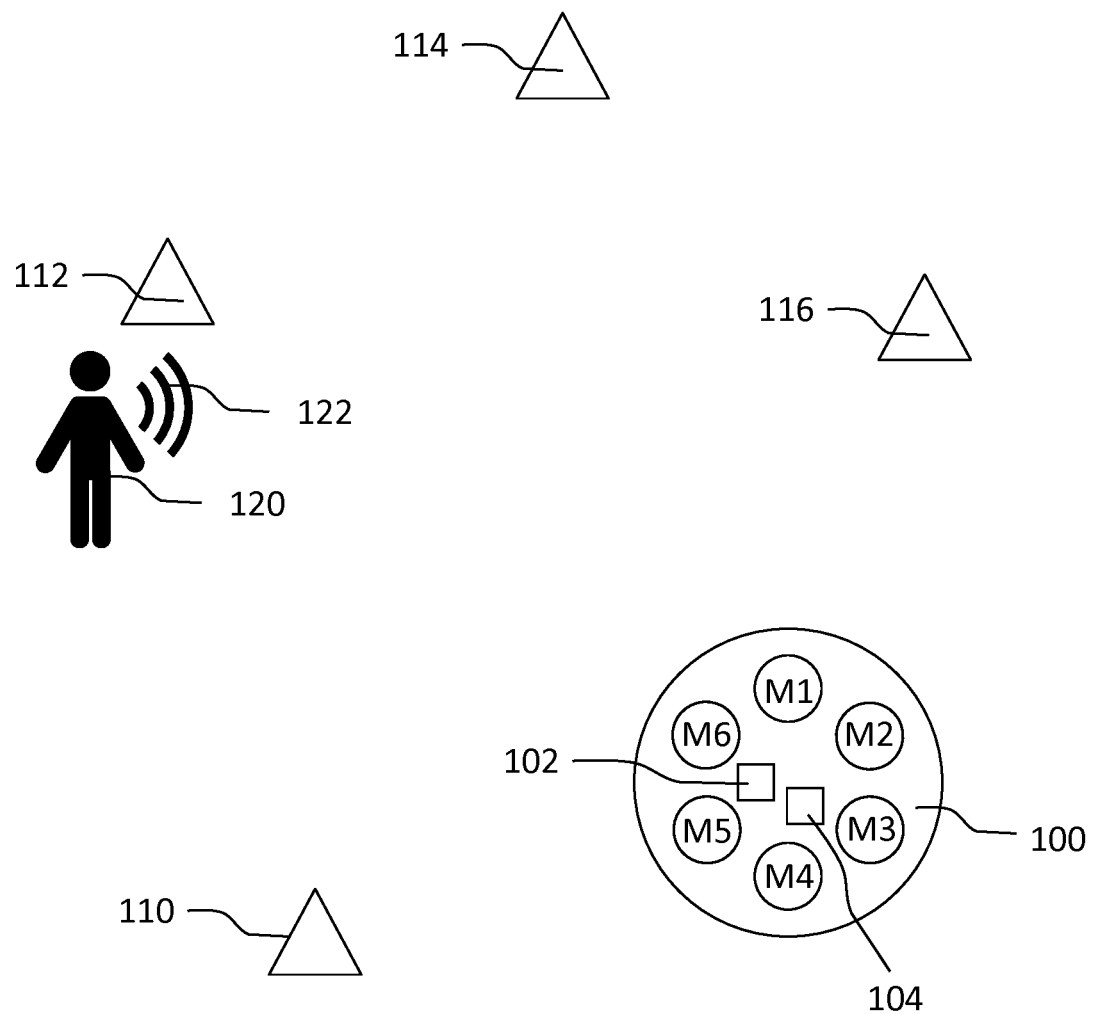
FIG. 1 shows schematically an embodiment of a top view of a system for determining a location of an object, wherein a plurality of microphones are comprised in one device.
Figure 2:
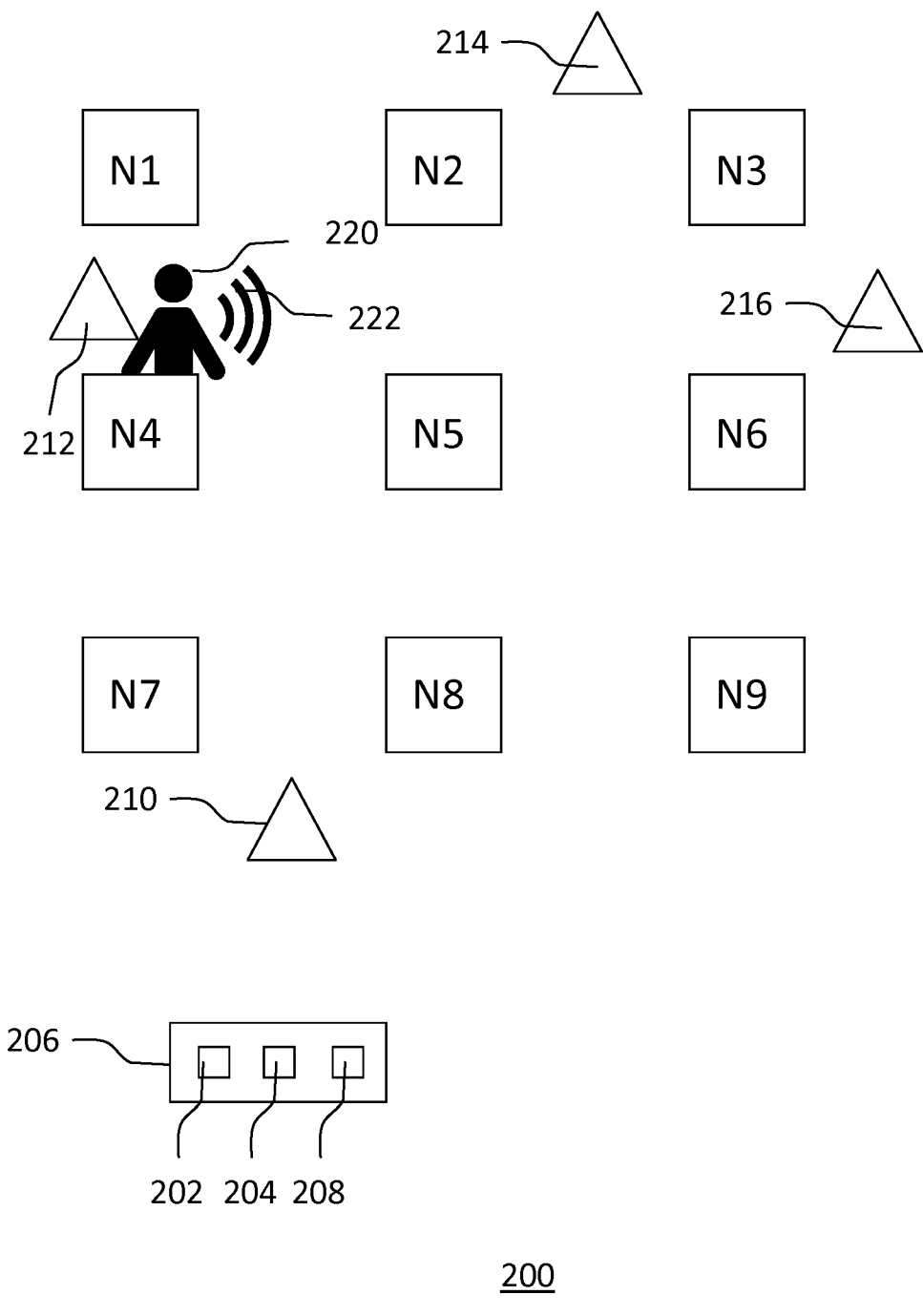
FIG. 2 shows schematically an embodiment of a top view of a system for determining a location of an object, wherein a plurality of microphones are distributed throughout a space.

FIGS. 1 and 2 show schematically embodiments of positioning systems 100, 200 for determining a location of an object. The systems 100, 200 comprise a plurality of microphones M1-M6, N1-N9 configured to receive a sound input 122, 222 from a user 120, 220. The systems 100, 200 further comprise a localization module 102, 202 configured to determine a user location of the user 120, 220 relative to the plurality of microphones M1-M6, N1-N9 based on differences between the sound input 122, 222 received at different microphones of the plurality of microphones M1-M6, N1-N9. The systems 100, 200 further comprise a processor 104, 204 configured to receive an identifier of the object, identify the object based on the identifier, determine the location of the object by setting the location of the object equal to the user location, and store the location of the object in a memory.

The plurality of microphones M1-M6, N1-N9 are configured to receive a sound input 122, 222 from a user 120, 220 when the user is located/positioned at the object. The sound input 122, 222 may be generated by the user (e.g. speech, clapping, whistling, finger snapping, etc.) or be generated by a user device (e.g. a smartphone, a smartwatch, a tablet pc). The sound input may be generated by the user device, for example, upon receiving a user input at the user device. The user may, for example, select an object via a user interface of the user device when the user device is located at the object, whereupon the user device may generate the sound input.

In a system 100 wherein the plurality of microphones M1-M6 are comprised in a single device 100 (e.g. the system of FIG. 1), the processor 204 may be communicatively coupled to the plurality of microphones M1-M6. Alternatively, in a system 200 wherein the plurality of microphones N1-N9 are distributed throughout a space (e.g. the system of FIG. 2), the localization module 202 and the processor 204 may be comprised in further device 206, for example in a central control device (e.g. a building automation system, a smart home system, etc.). The further device may further comprise a receiver 208 configured to communicate with the plurality of microphones N1-N9 via a (wireless) network. The receiver 208 may comprise hardware for receiving the sound input 222 via any wired or wireless communication protocol. Various wired and wireless communication protocols may be used, for example Ethernet, DMX, DALI, USB, Bluetooth, Wi-Fi, Li-Fi, 3G, 4G or ZigBee.

The localization module 102, 202 may be a separate processor such as a microcontroller. Alternatively, the localization module 102, 202 may be a software program running on the processor 104, 204. The localization module 102, 202 is configured to determine a user location (e.g. user coordinates) of the user 120, 220 relative to the plurality of microphones M1-M6, N1-N9 based on differences between the sound input 122, 222 received at different microphones of the plurality of microphones M1-M6, N1-N9. The localization module 102, 202 may have access to a memory storing the locations of the plurality of microphones (e.g. microphone coordinates) relative to each other (and/or relative to the environment), which enables the localization module 102, 202 to determine the user location of the user 120, 220 relative to the plurality of microphones M1-M6, N1-N9 (and, optionally, relative to the environment). The localization module 102, 202 may be configured to determine the user location based on differences in signal strength of the sound input 122, 222 received at different microphones of the plurality of microphones M1-M6, N1-N9. The localization module 102, 202 may compare the differences in signal strength (e.g. by comparing spectrograms and/or dB levels of different microphones) to determine, for example by triangulation or trilateration, the user location of the user 120, 220. Additionally or alternatively, the localization module 102, 202 may be configured to determine the location of the user 120, 220 based on differences in time between receiving the sound input 122, 222 at different microphones of the plurality of microphones. By comparing differences in time of arrival of the sound input 122, 222 at different microphones, the localization module 102, 202 may determine, for example by triangulation or trilateration, the user location of the user 120, 220. The localization module 102, 202 may be further configured to access information about positions of the plurality of microphones M1-M6, N1-N9 relative to the space, and configured to determine the user location relative to the space based on differences between the sound input 122, 222 received at different microphones of the plurality of microphones M1-M6, N1-N9.

FIG. 1 shows schematically an embodiment of a top view of a system 100 for determining a location of an object 110, 112, 114, 116, wherein a plurality of microphones M1-M6 are comprised in a single device 100. The localization module 102 may determine that the user 120 is located somewhere in the direction of microphone M6 because the sound input 122 will arrive at M6 first, and, for example, subsequently at M1, M5, M2, M4 and M3. The processor 104 may receive the identifier of an object (object 112 in this example) and determine the location of object 112 by setting the location of the object 112 equal to the user location. The localization module 102 may be further arranged for accessing a memory storing a location of the device 100 relative to the environment. Based on this information, the localization module 102 may determine the user location relative to the environment. The localization module 102 may be further configured to determine a distance between the positioning device 100 and the sound input 122 (and therewith the user 120) based on an intensity of the sound input 122. This enables the localization module 102 to determine the user location based on the distance and the direction. Additionally or alternatively, the localization module 102 may compare differences between the sound input 122 received at different microphones of the plurality of microphones M1-M6 and use triangulation/trilateration positioning techniques to pinpoint the location of the sound input 122 (and therewith the user location of the user 120). The user may subsequently move to another object, for example object 110, object 112 or object 114 and provide the sound input (and the identifier) at that object such that the location of that object can be determined and stored in the memory.

The positioning system 100 may further comprise an orientation sensor (e.g. a gyroscope and/or an accelerometer) for providing an orientation signal indicative of an orientation of the device 100. If a user would rotate the device 100, it is desirable that the localization module 102 still 'knows' the orientation of the device 100 relative to the space. Therefore, the localization module 102 may be further configured to determine the location of the user relative to the positioning system 100 based on the orientation signal. The positioning system 100 may further comprise a location detection means for detecting a location of the device 100. The location detection means may comprise a receiver configured to receive a location signal from a further device (e.g. from an (indoor) positioning system, from a light source emitting light comprising an embedded code representative of the location of that light source, etc.). If a user would move the device 100 to a new location, it is desirable that the localization module 102 still 'knows' the location of the device 100 relative to the space. Therefore, the localization module 102 may be further configured to determine the location of the user relative to the positioning system 100 based on the location signal.

FIG. 2 shows schematically an embodiment of a top view of a system 200 for determining a location of an object 210, 212, 214, 216, wherein the plurality of microphones N1-N9 are distributed throughout the space. The localization module 202 and the processor 204 may be comprised in further device 206, for example in a central control device (e.g. a building automation system, a smart home system, etc.). The further device 206 may further comprise a communication unit 208 configured to communicate with the plurality of microphones N1-N9 via a (wireless) network and to receive the sound input received at the different microphones N1-N9. The localization module 202 may determine that the user 220 is located close to microphones N1 and N4, because the time of arrival of the sound input 222 at microphones N1 and N4 occurs earlier than the time of arrival of the sound input 104 at microphones N2, N3 and N5-N9. The localization module 202 may be further arranged for accessing a memory storing locations of the plurality of microphones N1-N9 relative to the environment. Based on this information, the localization module 202 may determine the user location relative to the environment. The localization module 202 may be further configured to determine a distance between each of the plurality of microphones N1-N9 and the sound input 222 (and therewith the user 220) based on an intensity of the sound input 222 received at each of the plurality of microphones N1-N9. This enables the localization module 202 to determine the user location based on the distance. The localization module 202 may, for example, determine that the intensity of the sound input received at microphones M1 and N4 is stronger than the intensity at other microphones, and thereby determine that the user 220 is located in between these microphones. Additionally or alternatively, the localization module 202 may compare differences between the sound input 222 received at different microphones of the plurality of microphones N1-N9 and use triangulation/trilateration positioning techniques to pinpoint the location of the sound input 222 (and therewith the user location of the user 220).

The processor 104, 204 (e.g. a microcontroller, circuitry, a microchip) is configured to receive an identifier of the object and identify the object based on the identifier. The object may for example be a device (e.g. furniture such as a couch, a chair or a table, an electronic device such as a TV, a lighting device, a (kitchen) appliance, or any other type of object. The (unique) identifier may comprise information about the object (e.g. the object type, a current setting of the object, etc.).

The sound input 122, 222 may comprise the identifier of the object, and the processor 104, 204 may be configured to retrieve the identifier from the sound input 122, 222. The sound input may 122, 222, for example, be a voice input comprising information about the object (for example, the voice input may comprise "this is the location of the [name of object]", wherein the [name of object] may be the identifier). The processor 104, 204 may use voice recognition for retrieving the identifier from the sound input 122, 222. This enables a user to commission the objects by providing an object description at the location of the object. Object descriptions may already be stored in a memory (e.g. in a smartphone, a bridge, a home control system, remote server, etc.) and the processor 104, 204 may have access to these object descriptions, such that the processor 104, 204 may compare the received object description with a stored object description in order to identify the object. A user may, for example, stand nearby an object, which object may have an object description "kitchen lamp 1", and provide a voice command "this is kitchen lamp 1", whereupon the processor 104, 204 may compare the object description "kitchen lamp 1" to stored object descriptions and thereby identify "kitchen lamp 1". The localization module 102, 202 may determine the user location based on differences between the sound input received at different microphones of the plurality of microphones M1-M6, N1-N9. After determining the user location and identifying the object ("kitchen lamp 1") based on the identifier, the localization module 102, 202 may determine the location of the object based on the user location. The processor 104, 204 may then store the object location (equal to the user location) of the object ("kitchen lamp 1") in a memory.

Additionally or alternatively, the positioning system 100, 200 may further comprise a receiver configured to receive the identifier from the object. The object may be a device (e.g. a lighting device, an appliance, etc.) configured to transmit its identifier to the positioning system 100, 200. The (unique) identifier may comprise information about the object (e.g. the object type, a current setting of the object, etc.). The receiver may comprise hardware for receiving the identifier via any wired or wireless communication protocol. Various wired and wireless communication protocols may be used, for example Ethernet, DMX, DALI, USB, Bluetooth, Wi-Fi, Li-Fi, 3G, 4G or ZigBee.

Additionally or alternatively, the receiver may be configured to receive the identifier from a further device, for example a smartphone, which may be operated by the user 120, 220. The user 120, 220 may instruct the further device to start transmitting the identifier of a specific object, and the user 120, 220 may provide a sound input, which enables the processor 104, 204 to determine that that sound input 122, 222 (and therewith the location of that sound input) corresponds to that specific object. In embodiments, the identifier may be a (QR) barcode or an (NFC) tag which may be detected by a detector. The detector may be comprised in the positioning system 100, 200, or the detector may be comprised in the further device (e.g. a smartphone) configured to transmit the detected identifier to the positioning system 100, 200. The receiver may comprise hardware for receiving the identifier via any wired or wireless communication protocol. Various wired and wireless communication protocols may be used, for example Ethernet, DMX, DALI, USB, Bluetooth, Wi-Fi, Li-Fi, 3G, 4G or ZigBee.

The processor 104, 204 is further configured to determine the location of the object by setting the location of the object equal to the user location, and to store the location of the object in a memory. The positioning system 100, 200 may be communicatively coupled to or comprise a memory configured to store associations (e.g. a look-up table) between objects and their locations. The memory may be comprised in a (remote) server, for example accessible via the internet. By setting the user location equal to the location of the object, a user 120, 220 can simply walk/move to an object of which the location needs to be stored in the memory (or of which the location needs to be updated, for example after a repositioning of the object), and provide the sound input 122, 222. The positioning system 100, 200 may further comprise a communication unit configured to communicate the location(s) of the object(s) to another device.

In embodiments wherein the localization module 102, 202 is further configured to access information about positions of the plurality of microphones M1-M6, N1-N9 relative to its environment and configured to determine the user location (and therewith the location of the object) relative to the environment, the processor 104, 204 may be configured to generate a map of the space and determine a position of the object on the map based on the location of the object. The location of the object may, for example, be a set of 2D or 3D coordinates in a space (e.g. a room), and the processor 104, 204 may map these coordinates on a map of that space. The positioning system 100, 200 may further comprise a communication unit configured to communicate the created map to another device. The positioning system 100, 200 may, for example, transmit the map to a user interface device, or the positioning system 100, 200 may comprise a user interface. The map may be presented via the user interface (e.g. a display). The user interface may further comprise a user input means (e.g. a touchscreen, a pointing device, a gesture detector, etc.) configured to receive user input indicative of a selection of the object on the map. The selection of the object may for example be used for controlling the object (e.g. changing the light output of a lighting device) or for repositioning of the object on the map (a user may for example drag the object from a first location to a second location on the map). The latter may be beneficial if the positioning of the object on the map is incorrect, or when the object has been moved to a new location.

The sound input 122, 222 may further comprise a control command, the control command being a control command for controlling/configuring the object. The processor 104, 204 may be further configured to retrieve the control command from the sound input, and to control the object based on the control command. The processor 104, 204 may use speech recognition algorithms to retrieve the control command from the sound input 122, 222 and control the object according to the control command by communicating the lighting control command to the object. Thus, the processor 104, 204 may (first) determine the location of the identified object based on the sound input and based on the sound input 122, 222 and (second) control the identified object based on the sound input 122, 222. For example, when a user provides a voice input "this is living room lamp 1, turn it on" in a system wherein the objects are light sources, the localization module 102, 202 may determine the user location based on the differences of the sound input received by the microphones, and the processor 104, 204 may identify the object as "living room lamp 1" based on the voice input and set the location of "living room lamp 1" equal to the user location and store the location of the "living room lamp 1" in a memory. The processor 104, 204 may further control "living room lamp 1" by generating a lighting control command comprising instructions for "living room lamp 1" to turn on and transmitting the lighting control command to "living room lamp 1".

The plurality of microphones M1-M6, N1-N9 may be configured to receive a subsequent sound input, which subsequent sound input comprises a control command, the control command being a control command for controlling/configuring the object. The processor 104, 204 may use speech recognition algorithms to retrieve the control command from the sound input 122, 222 and control the object according to the control command by communicating the lighting control command to the object. The localization module 102, 202 may be configured to determine which one or more objects are located at the user location by accessing the memory storing locations of the one or more objects, and to control the one or more objects based on the control command. The localization module 102, 202 may, for example, be configured to receive object coordinates indicative of the locations of a plurality of objects, and compare user coordinates of the user location to the received object coordinates in order to determine which of the plurality of objects are located within a predetermined proximity of the user location. For example, when a user provides a voice command "dim the lights" in a system wherein the objects are light sources, the localization module 102, 104 may determine the location of the user, and determine which object(s) (light source(s)) are within a predetermined proximity of the user by accessing a memory that stores the locations of the objects. The processor 104, 204 may generate and transmit a control command to dim the light source(s) that are located within the predetermined proximity. Additionally, the location module may be configured to determine the distance between the user location and the objects, and the processor may control the objects based on their distance from the user location. For example, light sources located nearby the user may be dimmed down with 50% and light sources farther away down with 25% and light sources even farther away down with 5%).

The positioning system 100, 200 may comprise hardware for transmitting the control command(s) via any wired or wireless communication protocol to the object(s). Various wired and wireless communication protocols may be used, for example Ethernet, DMX, DALI, USB, Bluetooth, Wi-Fi, Li-Fi, 3G, 4G or ZigBee.

The processor 104, 204 may be further configured to activate and deactivate a learning mode of the positioning system 100, 200. When the positioning system 100, 200 has been set to the learning mode, the positioning system 100, 200 may be configured to determine the location of the object. When the positioning system 100, 200 has not been set to the learning mode, the positioning system 100, 200 may be configured to receive control commands from users. The learning mode may, for example, be activated when the controller is powered up for the first time, when a user input has been received on a user device (e.g. a smartphone) connected to the positioning system 100, 200, when a new object has been added to the positioning system 100, 200, etc.

The processor 104, 204 may be further configured to identify the user 120, 220 based on the sound input 122, 222, and to control one or more objects further based on a user profile associated with the identified user. The processor 104, 204 may use voice recognition algorithms to identify the user, and/or the user may provide a voice command providing a user identifier (e.g. "this is [user name]"). The processor 104, 204 may be configured to access a database storing the user profile. The user profile may comprise user preferences (e.g. favorite light settings), and the processor may determine how to control the one or more objects based on these preferences.

Figure 3C:
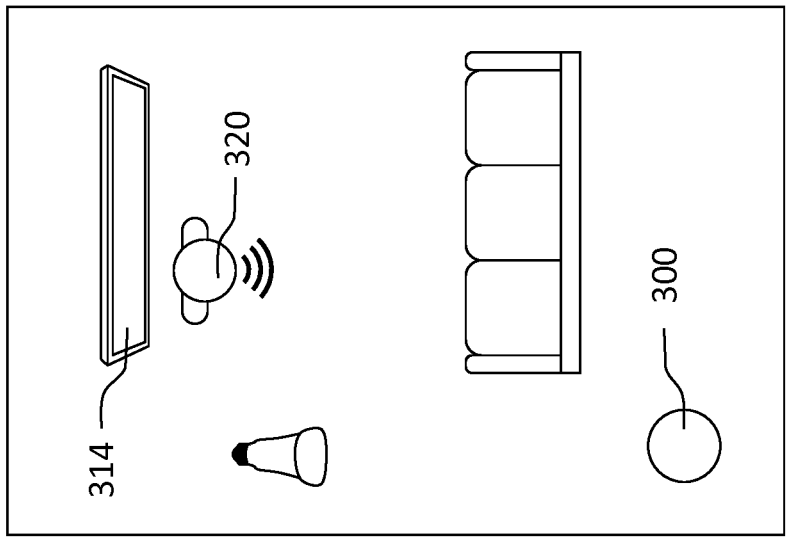
FIGS. 3a-3c show schematically embodiments of a top view of a system for determining a location of an object.
Figure 3B:
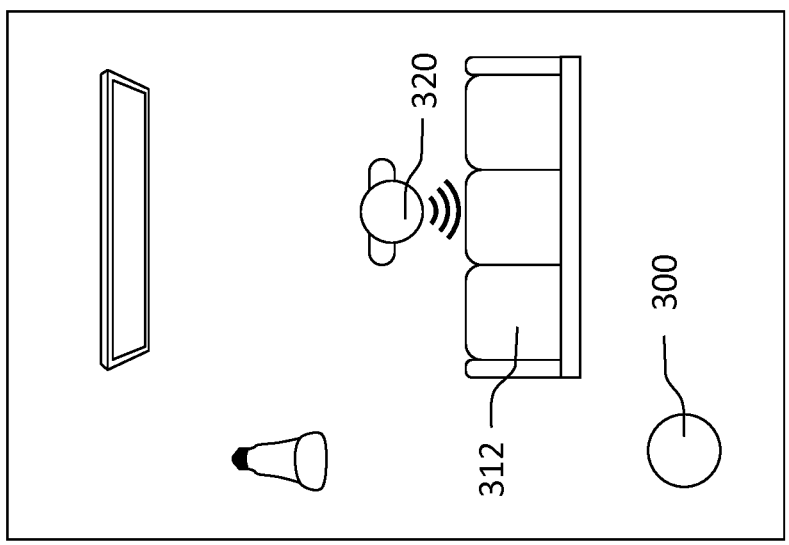
Figure 3A:
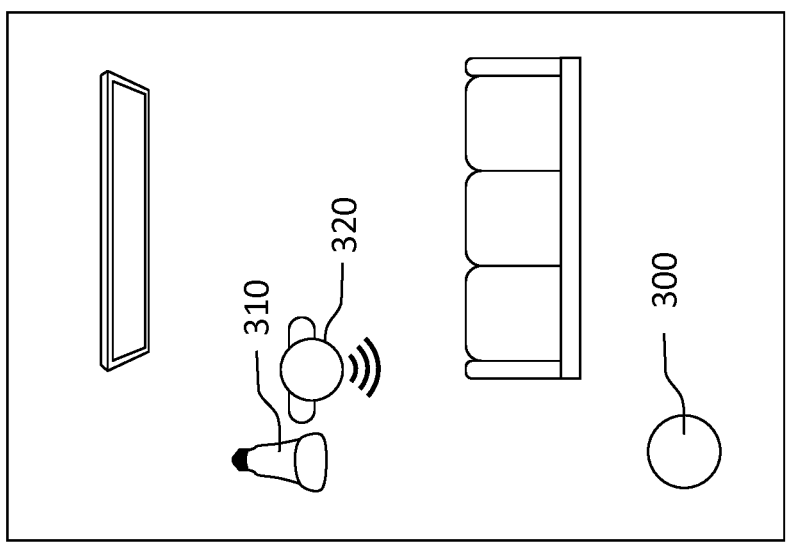

FIGS. 3a-3c illustrate how a user 320 may subsequently provide sound inputs to enable a positioning system 300 to determine the locations of a plurality of objects 310, 312, 314. First, as illustrated in FIG. 3a, the user 320 may move to lamp 310 and provide a first sound input. A plurality of microphones (not shown) of the positioning system 300 may receive the first sound input and a localization module (not shown) of the positioning system 300 may determine a first user location based on the first sound input. A processor (not shown) of the positioning system 300 may identify the lamp 310 (e.g. based on the first sound input, or based on a signal received from the lamp 310 or from a user device), set the location of the lamp 310 equal to the first user location and store the location of the lamp 310 in a memory. Second, as illustrated in FIG. 3b, the user 320 may move to couch 312 and provide a second sound input. The plurality of microphones of the positioning system 300 may receive the second sound input and the localization module may determine a second user location based on the second sound input. The processor of the positioning system 300 may identify the couch 312 (e.g. based on the second sound input, or based on a signal received from the couch 312 or from a user device), set the location of the couch 312 equal to the second user location and store the location of the couch 312 in the memory. Third, as illustrated in FIG. 3c, the user 320 may move to TV 314 and provide a third sound input. The plurality of microphones of the positioning system 300 may receive the third sound input and the localization module may determine a third user location based on the third sound input. The processor of the positioning system 300 may identify the TV 314 (e.g. based on the third sound input, or based on a signal received from the TV 314 or from a user device), set the location of the TV 314 equal to the third user location and store the location of the TV 314 in the memory.

Figure 4:
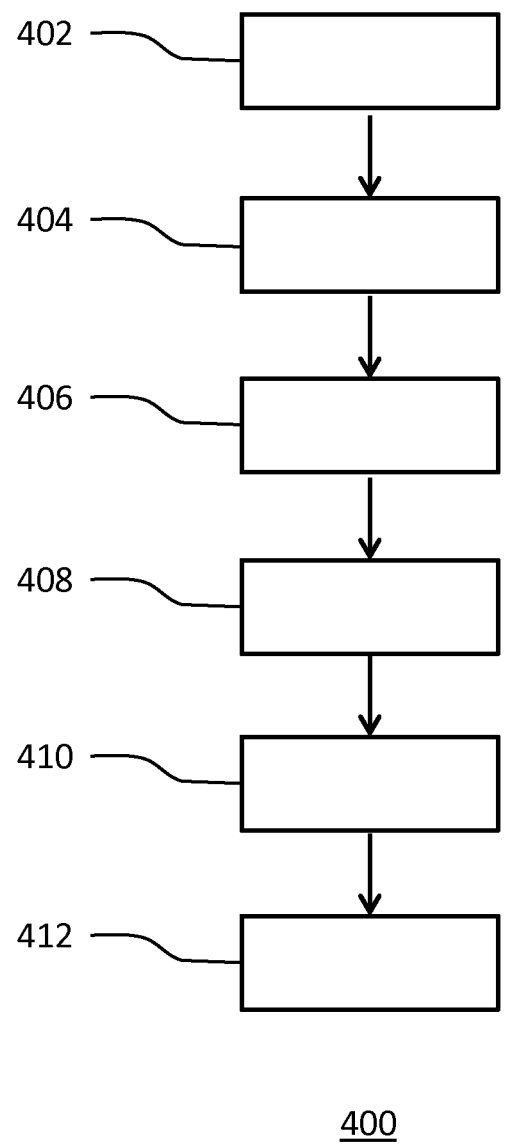
FIG. 4 shows schematically a method for determining a location of an object.

FIG. 4 shows schematically a method for determining a location of an object. The method comprises: receiving 402, by a plurality of microphones M1-M6, N1-N9, a sound input 122, 222 from a user 120, 220, determining 404 a user location of the user 120, 220 relative to the plurality of microphones M1-M6, N1-N9 based on differences between the sound input 122, 222 received at different microphones of the plurality of microphones M1-M6, N1-N9, receiving 406 an identifier of the object, identifying 408 the object based on the identifier, determining 410 the location of the object by setting the location of the object equal to the user location, and storing 412 the location of the object in a memory.

The method 400 may be executed by computer program code of a computer program product when the computer program product is run on a processing unit of a computing device, such as the processor 104, 204 of the positioning system 100, 200.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A positioning system for determining a location of an object, the positioning system comprising:
   a plurality of microphones configured to receive a sound input generated by a user,
   a localization module configured to determine a user location of the user relative to the plurality of microphones based on differences between the sound input received at different microphones of the plurality of microphones, and
   a processor configured to receive an identifier of the object, identify the object based on the identifier, determine the location of the object by setting the location of the object equal to the user location, and store the location of the object in a memory.

2. The positioning system of claim 1, wherein the sound input comprises the identifier of the object, and wherein the processor is configured to retrieve the identifier from the sound input.

3. The positioning system of claim 1, wherein the positioning system comprises a receiver configured to receive the identifier from the object or from a further device.

4. The positioning system of claim 1, wherein the object is located in a space, and wherein the localization module is further configured to access information about positions of the plurality of microphones relative to the space, and configured to determine the user location relative to the space based on differences between the sound input received at different microphones of the plurality of microphones.

5. The positioning system of claim 4, wherein the positioning system is comprised in a portable device, and wherein the positioning system comprises an orientation and/or a location sensor, and wherein the localization module is configured to determine the user location relative to the space further based on an orientation signal received from the orientation senor and/or a location signal received from the location sensor.

6. The positioning system of claim 4, wherein the processor is configured to generate a map of the space, and determine a position of the object on the map based on the location of the object.

7. The positioning system of claim 1, wherein the localization module is configured to determine the location of the user based on differences in signal strength of the sound input received at different microphones of the plurality of microphones, and/or based on differences in time between receiving the sound input at different microphones of the plurality of microphones.

8. The positioning system of claim 1, wherein the sound input further comprises a control command, and wherein the processor is further configured to retrieve the control command from the sound input, and to control the object based on the control command.

9. The positioning system of claim 1, wherein the plurality of microphones are configured to receive a subsequent sound input, which subsequent sound input comprises a control command, and wherein the localization module is configured to determine which one or more objects are located at the user location by accessing the memory storing locations of the one or more objects, and to control the one or more objects based on the control command.

10. The positioning system of claim 8, wherein the processor is configured to identify the user based on the sound input, and to control the one or more objects further based on a user profile associated with the identified user.

11. The positioning system of claim 1, wherein the object is a lighting device.

12. The positioning system of claim 1, wherein the sound input is a voice input.

13. A method for determining a location of an object, the method comprising:
    receiving, by a plurality of microphones, a sound input generated by a user,
    determining a user location of the user relative to the plurality of microphones based on differences between the sound input received at different microphones of the plurality of microphones,
    receiving an identifier of the object,
    identifying the object based on the identifier,
    determining the location of the object by setting the location of the object equal to the user location, and
    storing the location of the object in a memory.

14. A computer program product for a computing device, the computer program product comprising computer program code to perform the method of claim 13 when the computer program product is run on a processing unit of the computing device.

15. The method of claim 13, wherein the sound input further comprises a control command, and wherein the method further comprises:
    retrieving the control command from the sound input; and
    controlling the object based on the control command.

16. The method of claim 13, wherein the method further comprises:
    receiving, by the plurality of microphones, a subsequent sound input, said subsequent sound input comprising a control command;
    determining which one or more objects are located at the user location by accessing the memory storing locations of the one or more objects; and
    controlling the one or more objects based on the control command.

* * * * *